Jan. 9, 1934.   M. L. ENGLER ET AL   1,942,639

STOCK RACK

Filed July 19, 1932

INVENTOR
Max L. Engler and
Walter J. Breth
BY Evans & McCoy
ATTORNEYS

Patented Jan. 9, 1934

1,942,639

UNITED STATES PATENT OFFICE 1,942,639

STOCK RACK

Max L. Engler and Walter J. Breth, Akron, Ohio, assignors to The General Tire & Rubber Company, Akron, Ohio, a corporation of Ohio Application July 19, 1932. Serial No. 623,388

1 Claim. (Cl. 154—14)

This invention relates to a method of and apparatus for handling rubberized cord fabric strips such as employed in the manufacture of pneumatic tire casings, and has for its object to reduce the labor involved in the handling of such rubberized fabric strips from the time the fabric is rubberized and cut to the proper length until it is applied to a tire casing being built upon a suitable core or drum.

Strips of rubberized cord fabric which are built up upon a core drum to form the body of a pneumatic tire casing have heretofore been stored preparatory to their use in building tire casings in so-called "books" consisting of large sheets of fabric bound together at one side and of a length greater than that of the rubberized strips, so that the strips of rubberized fabric which are bias cut at the ends and of a length somewhat greater than the circumference of the tire casing for which they are intended, can be laid flat between the sheets of fabric forming the leaves of the book. Owing to the length of the strips and, due to the fact that the books must be kept in a substantially horizontal position, the books containing the rubberized cord fabric strips are very bulky and inconvenient to handle.

It has been proposed to provide racks for the rubberized strips consisting of rods over which the individual strips may be hung. This method of handling the strips has been found to be objectionable, however, for the reason that the weight of the rubberized strips causes stretching and distortion of the fabric, which, by reason of its relatively weak cross threads connecting the main, diagonally disposed cords, will stretch by its own weight when rubberized and such distorted strips are very difficult to properly apply to the tire building drum or core.

The present invention provides a method of handling, by which the strips are supported throughout their length in such manner that distortion is avoided and by which the strips are transported more expeditiously than in the fabric books.

With the above and other objects in view, the invention may be said to comprise a method and apparatus as illustrated in the accompanying drawing hereinafter described and particularly set forth in the appended claim, together with such variations and modifications thereof as will be apparent to one skilled in the art to which the invention appertains.

Reference should be had to the accompanying drawing forming a part of this specification, in which.

Figures 1, 2:
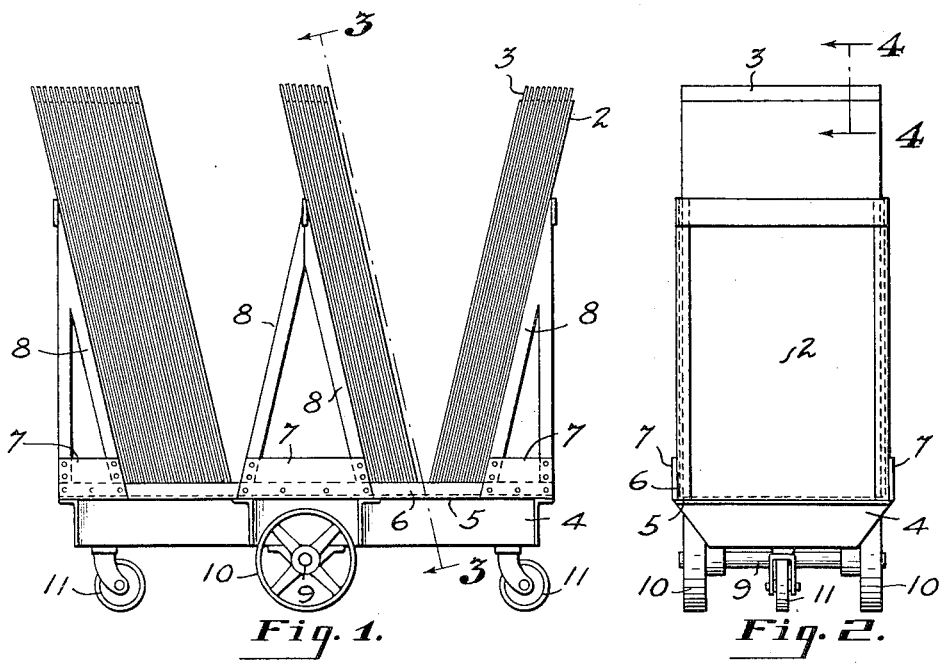
Figure 1 is a side elevation showing a stock rack embodying the invention.
Fig. 2 is an end elevation of the rack.

Referring to the accompanying drawing, rubberized fabric strips 1 delivered from the strip cutting machine are each hung over the upper edge of a supporting plate 2 which may be wood veneer, composition board or the like. The plates 2 are of a length somewhat in excess of half the length of the longest strips of rubberized fabric to be handled and of a width somewhat in excess of the width of the widest strip to be handled, so that a strip of rubberized fabric can be hung over the top edge of a supporting plate with the end portions thereof lying flat against the opposite faces of the plate. The plates 2 are supported on their lower edges between dividing plates 3 which may be thin sheet metal plates preferably somewhat longer than the supporting plates 2. The plates 2 and 3 are supported in stacks on a suitable rack which has a base 4 upon which the lower edges of the plates rest. The base 4 may comprise parallel supporting bars spaced apart a distance corresponding to the width of the plate. These bars may be of angle form inwardly projecting supporting flanges 5, upon which the lower edges of the plates rest, and vertical flanges 6 which project upwardly above the lower edges of the plates and prevent lateral displacement of the plates. The rack is provided with suitable means for supporting one or more stacks of plates at a small inclination to the vertical at either side of a central vertical plane so that the individual plates may be rocked about their lower edges from one inclined position to the other to permit access to the supporting plates one at a time for applying the rubberized strips thereto or for removing the rubberized strips therefrom. As herein shown, the rack is provided with spaced standards 7 which are provided with opposed, downwardly converging faces 8 against which the stacks of plates may be supported. A stack of plates is placed between a pair of adjacent standards 7 with their lower end edges resting on the flanges 5 and with the stack resting against one or the other of the inclined faces 8 of the standards.

Figures 3, 4:
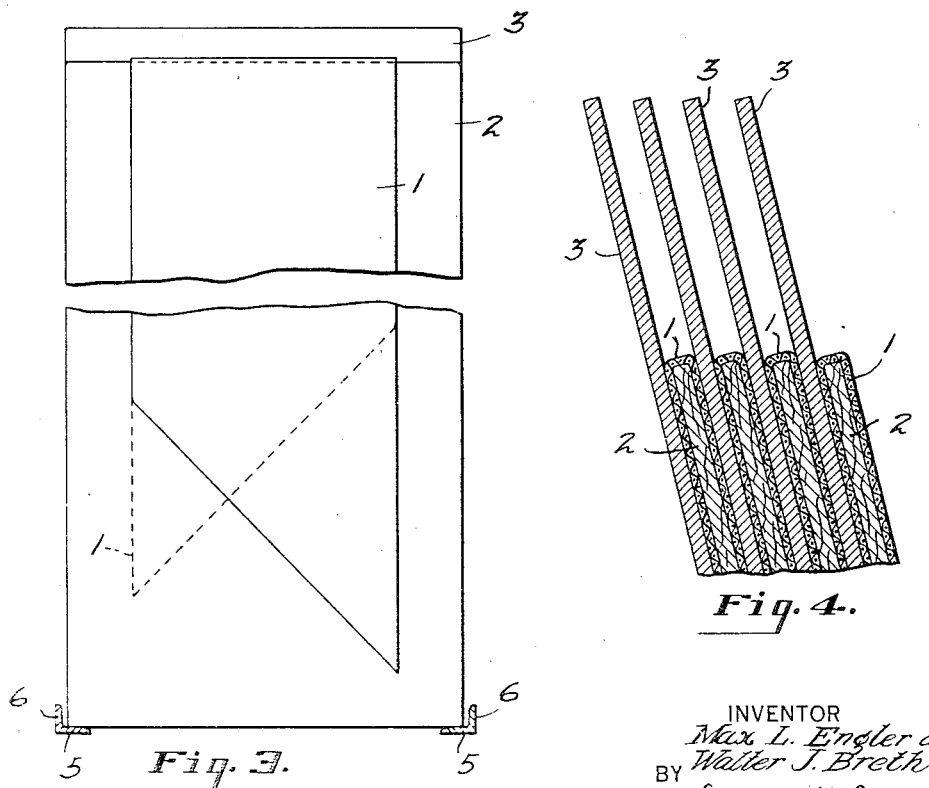
Fig. 3 is a section taken on the line indicated at 3—3 in Fig. 1.
Fig. 4 is a fragmentary section taken on the line indicated at 4—4 in Fig. 2.

In loading the rack with rubberized strips the topmost dividing plate is rocked over against the opposite standard 7 exposing the first supporting plate 2. The supporting plate may then be rocked to a vertical position and the strip of rubberized fabric 1 hung thereon as shown in Fig. 3 of the drawing with the fabric lying flat against the opposite faces of the plate and the bias cut ends above the bottom edges of the plate. The supporting plate with the rubberized fabric strip thereon is then laid against the dividing plate previously separated from the stack and another dividing plate is rocked over against the supporting plate so that the fabric strip is held flat against the supporting plate by the two dividing plates engaging the fabric on opposite sides of the supporting plate. This operation is repeated until all of the supporting plates are loaded, after which the strips may be taken from the rack one at a time as needed for the manufacture of tire casings. The removal of strips from the plates is accomplished in a manner similar to the loading thereof, the plates being successively rocked to their reverse position on the rack to expose successive strips of rubberized fabric.

It is usually desirable to transport the rack containing the rubberized cord fabric strips from the strip cutting machine to the tire building machine after the rack is loaded, and the rack may conveniently be made in the form of a truck which, as shown in Figs. 1 and 2, may have an axle 9 substantially midway between the ends of the base 4 of the rack, the axle 9 being provided with supporting wheels 10 at the ends thereof. As herein shown, a caster wheel 11 is provided at each end of the rack 4 so that the truck can be conveniently steered along the factory floor.

It will be apparent that the present invention provides a very simple and efficient method of handling rubberized cord fabric strips and that by reason of the fact that the strips are mounted in stacks of supporting and dividing plates disposed in substantially upright position, the racks occupy a relatively small amount of space.

Furthermore, it is to be understood that the particular form of apparatus shown and described, and the particular procedure set forth, are presented for purposes of explanation and illustration and that various modifications of said apparatus and procedure can be made without departing from our invention as defined in the appended claim.

What we claim is:

The herein described method of handling rubberized cord fabric strips in the manufacture of pneumatic tire casings which comprises draping the individual fabric strips over the top edges of supporting plates with the opposite ends of the strips against opposite faces of the plates, interposing dividing plates between the supporting plates, supporting the plates in a stack with the individual plates resting on their lower edges and having a limited rocking movement about their lower edges, and removing the strips as required for tire building operations one at a time from the supporting plates.

MAX L. ENGLER.
WALTER J. BRETH.